United States Patent [19]
Hesse et al.

[11] Patent Number: 5,270,357
[45] Date of Patent: Dec. 14, 1993

[54] THICKENED CURABLE MOLDING COMPOUND OF UNSATURATED POLYESTER RESINS

[75] Inventors: Anton Hesse, Weinheim; Dieter Buhl, Frankenthal; Birgit Potthoff-Karl, Ludwigshafen; Axel Sanner, Frankenthal, all of Fed. Rep. of Germany

[73] Assignee: BASF Aktiengesellschaft, Ludwigshafen, Fed. Rep. of Germany

[21] Appl. No.: 825,091

[22] Filed: Jan. 24, 1992

[30] Foreign Application Priority Data

Feb. 28, 1991 [DE] Fed. Rep. of Germany ....... 4106341

[51] Int. Cl.$^5$ ............................................. C08L 67/06
[52] U.S. Cl. .................... 523/526; 524/430; 524/432; 524/433; 524/436
[58] Field of Search ................ 523/526; 524/430, 433, 524/432, 436

[56] References Cited

U.S. PATENT DOCUMENTS

| | | | |
|---|---|---|---|
| 3,250,738 | 5/1966 | Isaacs et al. | 523/526 |
| 3,718,714 | 2/1973 | Comstock et al. | 525/170 |
| 4,051,085 | 9/1977 | Hess et al. | 523/526 |
| 4,160,759 | 7/1979 | Gardner et al. | 523/526 |
| 4,806,603 | 2/1989 | Hess et al. | 525/445 |

FOREIGN PATENT DOCUMENTS

| | | | |
|---|---|---|---|
| 0021690 | 1/1981 | European Pat. Off. | 523/526 |
| 0319203 | 6/1989 | European Pat. Off. | |
| 54-065792 | 5/1979 | Japan | 523/526 |
| 1276198 | 6/1972 | United Kingdom. | |

Primary Examiner—Paul R. Michl
Assistant Examiner—John J. Guarriello
Attorney, Agent, or Firm—Oblon, Spivak, McClelland, Maier & Neustadt

[57] ABSTRACT

A curable thickened polyester resin molding compound contains from 0.1 to 20 parts by weight of a thermoplastic vinyl polymer which is compatible with the resin and contains acid groups.

7 Claims, No Drawings

THICKENED CURABLE MOLDING COMPOUND OF UNSATURATED POLYESTER RESINS

The present invention relates to a thickened uncrosslinked polyester resin molding compound which cures at above 50° C. by a free radical mechanism.

Thickened curable molding compounds are semi-finished products which are storable and moldable and which, after molding, are curable to completion to form fully molded articles. Examples are sheet molding compounds (SMCs) and bulk molding compounds (BMCs) which contain unsaturated polyesters and monomers (UP resins) and also reinforcing fibers and fillers. Their preparation and processing is described for example in P. F. Bruins' monograph, Unsaturated Polyester Technology, Gordon and Breach Science Publishers 1976, pages 211 to 238. The conventional thickening of SMCs with alkaline earth metal oxides or hydroxides is based on salt formation with the polyester carboxyl groups. For this reason, liquid reactive systems which contain no or only very few acid groups cannot be used in SMC technology. Numerous UP resins—in particular the flexible ones and those of low molecular weight—do not thicken at all or only incompletely despite the presence of carboxyl groups. Using this thickening technique, therefore, only some of the liquid reactive systems can be used for SMC processes.

EP-A-228 922 describes a thickener system based on diisocyanates and aminobenzoic acid derivatives using which even carboxyl-free reactive resins can be thickened. However, such systems are moisture-sensitive and difficult to handle.

It is an object of the present invention to develop a thickener system which is simple to handle and with which even previously nonthickenable or difficult-to-thicken unsaturated polyester resins can be thickened.

A further problem with the thickening of unsaturated polyester resins is that, in the course of thickening, the viscosity rises very gradually and increases continuously during storage of the thickened molding compound, so that optimum flowability and hence good processibility are guaranteed only for a comparatively short period. However, ideal thickening behavior would be characterized by a rapid increase in viscosity within about 1–3 days to a level which will be stable for weeks.

We have found that these objects are achieved when the unsaturated polyester resin is admixed with from 0.1 to 20 %, based on its weight, of a thermoplastic vinyl polymer which is compatible with the resin, contains acid groups to an acid number of from 15 to 150, and has a K value of from 15 to 60 and thickening is effected with customary thickeners based on a metal compound.

The present invention accordingly provides a curable thickened molding compound containing A. 100 parts by weight of an unsaturated polyester resin,
B. from 0.1 to 20 parts by weight of a thermoplastic vinyl polymer which is compatible with A, contains acid groups to an acid number (determined acidimetrically in accordance with DIN 53 402) of from 20 to 150, and has a K value (as defined in DIN 51 562 Parts 1 and 3) of from 15 to 60,
C. from 0.1 to 10 parts by weight of a basic metal compound as thickener,
D. from 0.01 to 5 parts by weight of a polymerization initiator which decomposes at above 50° C.,
E. from 10 to 400 parts by weight of reinforcing fibers and/or fillers.

Thickening with the thickener system of the present invention produces within a short period molding compounds possessing a tack-free surface and good flowability, which remains virtually constant over weeks. The rate and extent of the thickening can be controlled via the acid number, K value and concentration of the polymer component B and via the concentration and solubility of the resultant metal salt in the resin system. The thickening of customary unsaturated polyester resins which have normal thickening characteristics is more rapid in the presence of the vinyl polymer B than with the conventional MgO thickener alone.

DE-B-1 953 062 (GB 1,276,198) and DE-B-2 104 575 (U.S. Pat. No. 3,718,714) describe unsaturated polyester resin molding compounds which contain a thickener and a thermoplastic polymer which contains from 0.1 to 5 % by weight of acid groups. Examples of polymers which contain the acid groups are carboxyl-containing methyl methacrylate and vinyl acetate polymers. These low-profile additives are said to improve the shrinkage and surface properties of cured moldings. Nothing is said about any influence on the thickenability of polyester resins. Methyl methacrylate polymers are incompatible with unsaturated polyester resins, i.e. they are not effective additives for the purposes of the present invention. The acid numbers of the vinyl polymer examples mentioned DE-B-21 04 575 are all within the range from 5 to 15. However, tack-free thickening within the meaning of the present invention is not possible with polymers having such a low acid number.

On the other hand, shrinkage compensation within the meaning of DE-B-21 04 575 requires that the acid number of the vinyl acetate polymers be distinctly below 20. If the acid number is higher, the mold pieces obtained after curing have a nonuniform, rough surface. Accordingly, the cited reference cannot be taken to teach adding vinyl acetate polymers having an acid number above 20 to unsaturated polyester resins.

The present invention encompasses two preferred embodiments. The first embodiment comprises using an unsaturated polyester resin which without the addition of the vinyl polymer B would not give tack-free thickening at all with the basic metal compound C alone. The second embodiment can be effected with basically any unsaturated polyester resin. Here the added vinyl polymer B acts as a thickening accelerant and ensures optimum processing behavior of the thickened molding compounds over a prolonged period.

The starting materials may be characterized as follows:

A. The unsaturated polyester resins are solutions of unsaturated polyesters in copolymerizable monomers, customary monomer contents ranging from 20 to 60 % by weight. Suitable polyesters are the known condensation products of polybasic, in particular dibasic, carboxylic acids and their esterifiable derivatives, in particular their anhydrides, linked in ester fashion to polyhydric, in particular dihydric, alcohols, with or without additional radicals of monobasic carboxylic acids or monohydric alcohols, as long as at least some of the starting materials have ethylenically unsaturated, copolymerizable groups.

Suitable copolymerizable monomers are the customary allyl and vinyl compounds, preferably styrene.

The acid number of the unsaturated polyester resin should be below 100, in particular within the range from 10 to 60, and their average molecular weight should be within the range from 500 to 5,000. Particular preference is given to polyester resins of maleic acid, optionally together with o-phthalic acid or isophthalic acid on the one hand and diols, such as dipropylene glycol, diethylene glycol, ethylene glycol, neopentylglycol and/or 1,2-propanediol on the other hand, dissolved in styrene.

The following unsaturated polyester resins are preferred for the first embodiment mentioned:

1. Styrene solutions of cycloalkenyl- or cycloalkyl-containing unsaturated polyesters. Suitable cycloalkenyl groups are in particular cyclopentene and cyclohexene groups.

To incorporate cyclopentene and cyclohexene groups into the unsaturated polyesters, the latter are modified with dicyclopentadiene or derivatives or substitution products thereof, preferably with dicyclopentadiene, endomethylenetetrahydrophthalic acid, N-hydroxyalkyltetrahydrophthalimide or N-hydroxyalkylendomethylenetetrahydrophthalimide, but also hydrogenated bisphenol A or cyclohexanedimethanol. These reactions are known, for example from W. Meyer, Kunststoffe 66 (1976), 436. If the starting materials used are diesters having a high acid number or free malonic acid and a temperature of from 120° to 240° C. is employed, essentially an addition of the dicyclopentadiene to terminal carboxyl or hydroxyl groups is obtained. If polyesters of low acid number are used and higher temperatures are employed, preferably above 170° C., the dicyclopentadiene splits into two molecules of cyclopentadiene, which adds onto ethylenedicarboxylic ester structures. These structures can also be produced by using endomethylenetetrahydrophthalic acid or anhydride. The main advantage of such polyester resins is the high temperature resistance of the cured moldings.

2. Styrene solutions of unsaturated polyesters which have an acid number of less than 20, in particular less than . . . Suitable polyesters have the above-described composition. Polyesters having an acid number of less than 20 are obtained by using a considerable excess of diol or incorporating monofunctional alcohols, e.g. 2-ethylhexanol or stearyl alcohol, as cocondensed units. Such unsaturated polyesters give resins of particularly low viscosity and good impregnation characteristics. They can be advanced with diisocyanates and then produce flexible moldings.

3. Styrene solutions of unsaturated polyesters having an average molecular weight of less than 1,000. They again have the above-described composition. They are prepared by using the acid or alcohol component in considerable excess or adding chain terminators. These resins likewise have good impregnation characteristics, making it possible to obtain moldings containing particularly few air inclusions.

4. Solutions of unsaturated polyesters in hydroxyl-containing monomers. Suitable monomers are for example hydroxyethyl (meth)acrylate, hydroxypropyl (meth)acrylate, trimethylolpropane mono(meth)acrylate, trimethylolpropane di(meth)acrylate, glycerol mono(meth)acrylate and glycerol diacrylate. The advantage of such resins is that, by using the monomers mentioned, it is possible to dispense with the not entirely safe styrene, and that they permit good binding to fillers. If, for example, magnesium oxide alone is added to such resins, resin-soluble ionomers are obtained, which do not ensure adequate thickening.

B. The molding compound of the present invention contains from 0.1 to 20, preferably from 0.5 to 15, parts by weight, based on A, of a thermoplastic vinyl polymer which is compatible with A, contains acid groups to an acid number of from 20 to 150, in particular from 30 to 80, and has a K value of from 15 to 60, in particular from 20 to 40. In the second preferred embodiment, where the vinyl polymer C acts as a thickening accelerant, an addition of from 0.1 to 5 % by weight is sufficient.

Suitable vinyl polymers are for example copolymers of vinyl esters, such as vinyl acetate and vinyl propionate, with unsaturated organic acids, such as crotonic acid, acrylic acid, methacrylic acid, maleic acid, maleic monoesters and vinylsulfonic acids. It is also possible to use corresponding copolymers of other vinyl monomers, such as vinylpyrrolidone, vinylcaprolactam, methyl methacrylate, tert-butyl acrylate and styrene, with unsaturated acids. Other possibilities include block and graft copolymers of thermoplastic vinyl polymers with the unsaturated acids mentioned, and also partially hydrolyzed polyvinyl esters. The vinyl polymers can be prepared in a conventional manner by free radical polymerization in bulk, solution, aqueous suspension or emulsion.

C. The molding compound contains from 0.1 to 10, preferably from 0.5 to 8, parts by weight, based on A, of a customary thickener based on a basic metal compound. The preference here is for oxides, hydroxides, alcoholates and salts of organic acids of metals of main groups I to III, in particular MgO, Mg(OH)$_2$, CaO, Ca(OH)$_2$, BaO, Li$_2$O, LiOH, Mg- and Al-alcoholates, aluminum ethylhexanoate and aluminum benzoate. There are also some suitable transition metal compounds, such as ZnO.

As is known for unsaturated polyester resins, here too it is possible to speed up the thickening by adding polar compounds, for example hydroxy compounds, such as water, propylene glycol or glycerol, carboxylic acids and anhydrides, such as benzoic acid, cyclohexanecarboxylic acid or hexahydrophthalic anhydride, or halides, such as choline chloride and lithium halides.

D. The polymerization initiators used are customary peroxides which decompose into free radicals at above 50° C. Their half-lives at 50° C. should preferably be longer than 100 h. Possibilities are diacyl peroxides, peroxydicarbonates, peroxy esters, perketals, ketone peroxide, hydroperoxides and dialkyl peroxides. Examples are succinyl peroxide, diacetyl peroxide, benzoyl peroxide, t-butyl peroctoate, p-chlorobenzoyl peroxide, t-butyl perisobutyrate, 3,5,5-trimethylcyclohexanoneperketal,2,5-dimethylhexane 2,5-diperbenzoate, t-butyl peracetate, t-butyl perisononanoate, di-t-butyl diperphthalate, 2,2-bis(t-butylperoxy)butane, t-butyl perbenzoate, dicumyl peroxide, 2,5-dimethyl-2,5-bis(t- butylperoxy)hexane, t-butyl hydroperoxide, cumene hydroperoxide, di-t-butyl peroxide, 2,5-dimethyl-2,5-bis(t-butylperoxy)hexyne, 1,1,4,4,7,7-hexamethylcyclo-4,7-diperoxynonane, diamyl peroxide, t-butyl perethylhexanoate, dilauroyl peroxide, t-butyl cumyl peroxide, γ-t-butyl peroxyvalerolactone, dimyristyl peroxydicarbonate and bis(4-t-butylcyclohexyl) peroxydicarbonate. It is also possible to use CC-labile compounds and azo compounds. It is not possible to use initiators which decompose below 50° C. They shorten the storage life and lead to premature gelling of the molding compound. An example of such a initiator is acetylacetone peroxide. Cold-curing systems likewise have too short a storage life.

The polymerization initiators are added in amounts of from 0.01 to 5, preferably from 0.5 to 3, parts by weight, based on A.

E. As reinforcing fibers it is possible to use the known inorganic and organic fibres, for example fibers made of glass, carbon, cellulose, polyethylene, polycarboxylic esters or polyamide. They can be in the form of short fibers, having a length of up to 5 cm, or in the form of milled fibers, but are preferably in the form of long fibers as individual rovings, webs of parallel rovings, fiber mats, fiber webs, fiber weaves or fiber knits.

The fibers are used in amounts of from 10 to 400 % by weight, preferably from 30 to 350 % by weight, based on A. In the case of glass fiber mats the particularly preferred glass content ranges from 100 to 300 % by weight, based on A, in the case of rovings it ranges from 30 to 150 % by weight and in the case of unidirectionally laid fibers it ranges from 150 to 350 % by weight.

Suitable fillers are for example customary finely powdered or granular fillers, such as chalk, kaolin, quartz powder, dolomite, baryte, metal powder, aluminum oxide hydrate, cement, talc, diatomaceous earth, wood meal, wood chips, pigments and the like. Their proportion is preferably from 10 to 300 % by weight, based on A.

F. As further additives it is possible to use the customary inhibitors, in particular phenols, quinones or nitroso compounds, lubricants, for example waxes, paraffins for avoiding surface evaporation and also flame retardants and mold release agents.

The molding compounds of the present invention are thickened, tack-free uncrosslinked compositions in a sheetlike, pasty or granulated form which have a long storage life. If 150 parts of calcium carbonate (Millicarb ®) are used per 100 parts of A+B, their viscosity at 23° C. should be not less than 500,000 mPa.s, preferably not less than 4,000,000 mPa.s, measured on the fiber-free molding compound using a Brookfield viscometer.

If the viscosity were lower, the compounds could not longer be classed as tack-free and they would present processing problems. Preferably, the viscosity should be within the range from $2 \times 10^6$ to $200 \times 10^6$ mPa.s. Above $200 \times 10^6$ mPa.s the compounds are already firm and hard, which would again present processing problems. Such firm compounds can in principle be processed by raising the temperature, in which case, however, there is then a risk of premature gelling occurring before the mold is completely full.

The attribute uncrosslinked means that no three-dimensional molecular network with atomic bonds must be present. In practice, crosslinking can be ascertained by attempting to dissolve the compound in suitable organic solvents, preferably in dimethylformamide, dimethyl sulfoxide or acetone, with or without heating. This should leave not more than 10 % by weight, preferably less than 1 % by weight, of the compound, excepting of course the reinforcing fibers and fillers, as insoluble residue.

The attribute "having a long storage life" means that, following storage at room temperature for at least three days, the molding compound should still be uncrosslinked, i.e. soluble within the meaning of the above definition. Preferably, the molding compounds of the present invention have longer storage lives, for example of more than 30 days.

A preferred method for preparing the molding compounds of the present invention consists in mixing the components A, B, D, E and F (with the exception of long reinforcing fibers), adding the component C at below 50° C. to initiate the thickening process, applying the still fluent material to reinforcing fibers if desired, and then completing the thickening. To speed up the thickening it can be advantageous in some cases to heat the material briefly to temperatures below 100° C., preferably below 80° C. The process of thickening the material is preferably virtually complete within a few hours.

It is assumed that, when the thickener C is added, it reacts with the acid groups of the vinyl polymer B to form a ionomer which is incompatible with the resin system, so that it separates and thereby raises the viscosity. In contradistinction to the thickening behavior of customary unsaturated polyester resins, the viscosity rises comparatively rapidly following addition of the thickener and then, once the maximum value has been attained, remains virtually constant.

The thickened compounds can be stored, for example in the wound-up and stacked state or else packaged, for a prolonged period until required for use. Possible methods for processing the molding compounds are compression molding, transfer molding, injection molding and thermoforming, and the curing is carried out at above 50° C., preferably at from 80° to 200° C., in particular at from 120° to 180° C.

In the examples, parts and percentages are by weight.

Preparation of unsaturated polyester resins A

Resin 1

An unsaturated polyester resin having an acid number of 17, an average molecular weight of about 2000 and a melt viscosity (125° C.) of 740 [mPa . s] was prepared from maleic anhydride and dipropylen glycol (molar ratio 1:1.08) by condensation at from 185° to 200° C. It was dissolved in 2-hydroxyethyl methacrylate in 65% strength and stabilized with 200 ppm of toluhydroquinone.

Resin 2

An unsaturated polyester having an acid number of 11 and an average molecular weight of about 1300 was prepared by reacting maleic anhydride and propylene glycol in a molar ratio of 1:1.28. It was dissolved in styrene in 65% strength and stabilized with 120 ppm of hydroquinone.

Resin 3

An unsaturated polyester having an acid number of 28 was prepared by a two-stage process in which, in the first stage, equimolar amounts of dicyclopentadiene and maleic acid were reacted at from 125° to 135° C. to form the maleic monoester, which was then condensed in a second stage with ethylene glycol at 190° C. The starting materials were in a molar ratio of maleic acid:dicyclopentadiene:ethylene glycol equal to 1:1:0.55. The unsaturated polyester was dissolved in styrene in 80% strength and stabilized with 85 ppm of hydroquinone.

Resin 4

An unsaturated polyester having an acid number of 27 was prepared by reacting maleic anhydride and dipropylene glycol in a molar ratio of 1:1. It was dissolved in 2-hydroxyethyl methacrylate in 65% strength and stabilized with 200 ppm of toluhydroquinone.

Preparation of vinyl polymers B

Polymer B1 was prepared by solution polymerization at 78° C. in ethanol by separate addition of the monomers and 0.8% of tert-butyl perpivalate, based on the monomers, in the course of 6 hours. After the reaction had ended, the solvent was removed under reduced pressure, and the residue was dissolved in 2-hydroxyethyl methacrylate and stabilized with 100 ppm hydroquinone and 200 ppm of dimethylquinone.

Polymers B2 to B5 were prepared by suspension polymerization in water at about 90° C. using 0.7% of tert-butyl peroctoate as initiator. The polymerization was followed by a steam distillation and isolation of the polymer particles in solid form. They were dried, dissolved in the monomer at about 80° C. and stabilized with 100 ppm of hydroquinone and 200 ppm of dimethylquinone.

TABLE 1

Monomer composition and parameters of polymers B

| Polymer | Monomers (% by weight) | | K value* | Acid number** |
|---|---|---|---|---|
| B1 | tert-butyl acrylate | (90) | 25.1 | 65 |
|  | methacrylic acid | (10) |  | 45 |
| B2 | vinyl acetate | (83.6) | 29.7 | 45 |
|  | crotonic acid | (6.4) |  |  |
| B3 | vinyl acetate | (50) | 36 | 66 |
|  | vinyl propionate | (40) |  |  |
|  | crotonic acid | (10) |  |  |
| B4 | vinyl acetate | (90) | 36 | 66 |
|  | crotonic acid | (10) |  |  |
| B5 | vinyl acetate | (98.8) | 35 | 7.5 |
|  | crotonic acid | (1.2) |  |  |

*The K value was determined in cyclohexanone (1% strength) in accordance with DIN 51 562.
**The acid number was determined acidimetrically in accordance with DIN 53 402.

TABLE 2

Composition and viscosity of polymer solutions

| Polymer solution | Polymer | (%) | Monomer | (%) | Viscosity at 23° C. [mPa · s] |
|---|---|---|---|---|---|
| 1 | B1 | (40) | 2-hydroxyethyl methacrylate | (60) | 4500 |
| 2 | B2 | (40) | 2-hydroxyethyl methacrylate | (60) | 5005 |
| 3 | B3 | (40) | styrene | (60) | 7084 |
| 4 | B4 | (25) | styrene | (75) | 7557 |
| 5 Comparison | B5 | (40) | 2-hydroxethyl methacrylate | (60) | 7909 |

EXAMPLES a) To assess the thickening characteristics of the polyester resins, 100 parts at a time of the resin systems were intensively stirred with chalk (Millicarb ®) as filler and MgO paste Luvatol MK35 (from Lehmann & Voss), and the mixtures were stored tightly closed at 23° C. Following different storage times, the viscosity of the preparations was measured with the aid of viscometer HBT-D model DV-II (from Brookfield). The results are summarized in Table 3. They show that the preparations based on acid-modified polymers according to the present invention thicken very rapidly to give dry compounds which are easy to handle. Without this modification (comparative tests 3, 6 and 11), thickening remains inadequate: the preparations remain liquid or tacky. This does not even change if the polymers of the present invention are replaced by polymers having a lower acid number of the type customary for the shrinkage compensation of UP resin molding compounds (Comparative Examples 4 and 5).

TABLE 3

Thickening of MgO-containing preparations

| | | Examples | | | | | | | | | | | |
|---|---|---|---|---|---|---|---|---|---|---|---|---|---|
| | | Comparisons | | | | | | | | | Comparison | | |
| | | 1 | 2 | 3C | 4C | 5C | 6C | 7 | 8 | 9 | 10 | 11C | 12 |
| Resin 1 | parts | 80 | 70 | 100 | 80 | 70 | — | — | — | — | — | — | — |
| Resin 2 | parts | — | — | — | — | — | 100 | 90 | 80 | 90 | 80 | — | — |
| Resin 3 | parts | — | — | — | — | — | — | — | — | — | — | 100 | — |
| Resin 4 | parts | — | — | — | — | — | — | — | — | — | — | — | 80 |
| Dolution 1 | parts | — | — | — | — | — | — | — | — | — | — | — | 20 |
| Solution 2 | parts | 20 | 30 | — | — | — | — | — | — | — | — | — | — |
| Solution 3 | parts | — | — | — | — | — | — | 10 | 20 | — | — | — | — |
| Solution 4 | parts | — | — | — | — | — | — | — | — | 10 | 20 | — | — |
| Solution 5 | parts | — | — | — | 20 | 30 | — | — | — | — | — | — | — |
| Chalk | parts | 120 | 120 | 120 | 120 | 120 | 175 | 175 | 100 | 175 | 100 | 120 | 100 |
| MgO paste | parts | 3.75 | 3.75 | 3.75 | 3.75 | 3.75 | 3.75 | 3.75 | 3.75 | 3.75 | 3.75 | 3.75 | 3.75 |
| Viscosity time-course [mPa · s] × 10⁶ in the course of storage (23° C.) | | | | | | | | | | | | | |
| 1d | | 23 | 93.2 | 0.90 | 3.80 | 7.52 | 2.08 | 58.2 | 16.6 | 82.6 | 130 | 0.01 | 2.04 |
| 3d | | 97.2 | >160 | 1.28 | 6.78 | 12.6 | 2.84 | 95.6 | 45.2 | 94.2 | — | 0.05 | 6.08 |
| 7d | | — | >160 | 1.47 | 8.26 | 13.1 | 2.92 | 96.4 | 49.2 | 97.8 | 126 | 0.06 | 8.64 |

TABLE 3-continued

| | Thickening of MgO-containing preparations | | | | | | | | | | | |
|---|---|---|---|---|---|---|---|---|---|---|---|---|
| | Examples | | | | | | | | | | | |
| | Comparisons | | | | | | | | Comparison | | | |
| | 1 | 2 | 3C | 4C | 5C | 6C | 7 | 8 | 9 | 10 | 11C | 12 |
| 14d | 95.5 | >160 | 1.63 | 6.58 | 7.78 | 4.48 | 110 | 77.2 | 110 | 150 | 0.09 | 13.5 |
| 21d | 80.4 | >160 | 1.17 | 4.90 | 6.78 | 3.98 | 127 | 78.5 | 127 | 156 | 0.10 | 17.0 |
| Paste | dry | dry | liquid | tacky | tacky | tacky | dry | dry | dry | dry | liquid | dry | b) Preparation and processing of SMC

EXAMPLE 13

A resin-filler mixture was prepared from the following components using a high-speed stirrer:

| | |
|---|---|
| 84 | parts of resin 4 |
| 16 | parts of polymer solution 2 |
| 170 | parts of chalk (Millicarb ®) as filler |
| 1.5 | parts of tert-butyl perbenzoate |
| 4.0 | parts of zinc stearate |
| 4.0 | parts of Luvatol MK 35, MgO paste (Lehmann & Voss) |

This mixture was processed with the aid of an experimental SMC setup into an SMC containing 28% by weight of chopped glass fiber rovings (2.5 cm in length) and which was stored between polyester films for 5 days. After the covering films had been removed, the thickened compound was found to be compression moldable in a polished steel mold (dimensions 0.4×58×25 cm) at 145° C. under 80 bar for 5 min. The result was a cured molding having a smooth surface and the following properties:

| | |
|---|---|
| Tensile modulus of elasticity (DIN 53 455): | 13.28 [kN/mm$^2$] |
| Tensile strength: | 78.6 [N/mm$^2$] |
| Extension: | 3.35 [%] |
| Impact strength (DIN 53 453): | 55.74 [kJ/m$^2$] | c) Accelerated thickening

EXAMPLE 14

An unsaturated polyester was prepared from maleic anhydride, o-phthalic anhydride, propylene glycol and dipropylene glycol in a molar ratio of 1:0.2:1:0.3. It had an acid number of 29, was inhibited with 120 ppm of hydroquinone and 500 pp.m of tert-butyl-p-cresol and dissolved in styrene in 65% strength.

To assess the thickening characteristics, the above resin was stirred with chalk (Millicarb ®) as filler and MgO paste Luvatol MK35 with and without polymer solution B3 and stored sealed air-tight at 23° C. for 24 hours. The table shows that the paste with polymer B3 (1.2%, based on the resin) attained a moldable consistency within this short storage time.

| | | Example | Comparison |
|---|---|---|---|
| UP resin | (parts) | 97 | 100 |
| Polymer solution 3 | (parts) | 3 | 0 |
| Chalk | (parts) | 125 | 125 |
| MgO | (parts) | 3.5 | 3.5 |
| Viscosity (23° C.) after 24 hours | [mPa · s] | 62.2 | 22.2 |

We claim:

1. A curable thickened molding compound comprising
   A. 100 parts by weight of an unsaturated polyester resin which, in the event component C of components B and C alone is present, results in tacky thickening;
   B. from 0.1 to 20 parts by weight of a thermoplastic vinyl polymer which is compatible with A, contains acid groups to an acid number (as defined in DIN 53402) of from 30 to 150, and has a K value (as defined in DIN 51562 Parts 1 and 3) of from 15 to 60;
   C. from 0.1 to 10 parts by weight of a basic metal compound as thickener;
   D. from 0.01 to 5 parts by weight of a polymerization initiator which decomposes at above 50° C.;
   E. from 10 to 400 parts by weight of reinforcing fibers or fillers, and optionally
   F. further customary additives.

2. A curable molding compound as claimed in claim 1, wherein the unsaturated polyester resin is a solution of an unsaturated polyester in styrene.

3. A curable molding compound as claimed in claim 2, wherein the polyester contains cycloalkenyl or cycloalkyl groups.

4. A curable molding compound as claimed in claim 2, wherein the polyester has an acid number of less than 20.

5. A curable molding compound as claimed in claim 2, wherein the polyester has a number average molecular weight of less than 1,000.

6. A curable molding compound as claimed in claim 1, wherein the unsaturated polyester resin is a solution of an unsaturated polyester in a hydroxyl-containing monomer.

7. A curable thickened molding compound comprising
   A. 100 parts by weight of an unsaturated polyester resin in styrene wherein the polyester resin contains cycloalkenyl or cycloalkyl groups and has an acid number of 10–60;
   B. from 0.1 to 20 parts by weight of a thermoplastic vinyl polymer which is compatible with A, contains acid groups to an acid number (as defined in DIN 53402) of from 30 to 150, and has a K value (as defined in DIN 51562 Parts 1 and 3) of from 15 to 60;
   C. from 0.1 to 10 parts by weight of a basic metal compound as thickener;
   D. from 0.01 to 5 parts by weight of a polymerization initiator which decomposes at a temperature above 50° C.;
   E. from 10 to 400 parts by weight of reinforcing fibers or fillers, and optionally
   F. further customary additives.

* * * * *